United States Patent [19]
Schaible et al.

[11] Patent Number: 6,114,950
[45] Date of Patent: Sep. 5, 2000

[54] OBSTACLE PROXIMITY WARNING DEVICE FOR VEHICLES

[75] Inventors: Uwe D. Schaible, Ancaster; Norman von Styp-Rakowski, Oakville, both of Canada

[73] Assignee: Specam Technologies, Inc., Cayman Islands

[21] Appl. No.: 09/303,677

[22] Filed: May 3, 1999

[51] Int. Cl.$^7$ .................................................. B60Q 1/00
[52] U.S. Cl. ...................... 340/435; 340/506; 340/901; 340/903; 340/933; 340/436
[58] Field of Search ................. 340/435, 436, 340/506, 901, 903, 933; 180/167, 169; 367/909

[56] References Cited

U.S. PATENT DOCUMENTS

| | | |
|---|---|---|
| 3,922,629 | 11/1975 | Hayakawa . |
| 4,467,313 | 8/1984 | Yoshino et al. . |
| 4,551,722 | 11/1985 | Tsuda et al. . |
| 4,797,673 | 1/1989 | Dombrowski ........................... 340/904 |
| 4,903,004 | 2/1990 | Starke et al. . |
| 4,967,860 | 11/1990 | Kremser ................. 180/169 |
| 5,373,482 | 12/1994 | Gauthier .................................... 367/99 |
| 5,574,426 | 11/1996 | Shisgal et al. . |
| 5,650,765 | 7/1997 | Park . |
| 5,764,136 | 6/1998 | Harron . |
| 5,844,471 | 12/1998 | Daniel .................... 340/436 |

FOREIGN PATENT DOCUMENTS

A2 0 066 691  4/1982  Germany ........................ G08B 13/16

Primary Examiner—Jeffery A. Hofsass
Assistant Examiner—Hung Nguyen
Attorney, Agent, or Firm—R. Craig Armstrong

[57] ABSTRACT

An obstacle proximity warning device for vehicles having an ultrasonic transceiver, for sending an ultrasonic signal and receiving the ultrasound reflected by an obstacle, a receiver signal process means connected to the ultrasonic transceiver, to generate trigger signals upon a threshold level signal being received from the ultrasonic transceiver, an alarm means responsive to the trigger signals, a housing in which the ultrasonic transceiver is mounted and a mounting bracket for fixedly mounting the housing to the vehicle. The mounting bracket has a resilient coating adapted to substantially absorb ultrasonic vibrations generated by the ultrasonic transceiver, to prevent the radiation of ultrasonic vibrations from other elements of the vehicle or the mounting bracket.

7 Claims, 20 Drawing Sheets

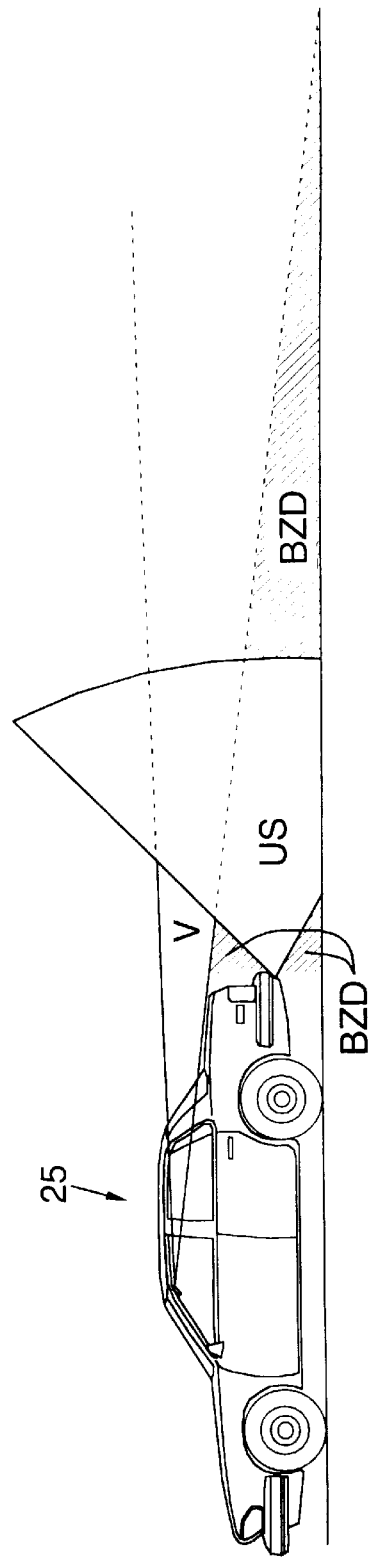
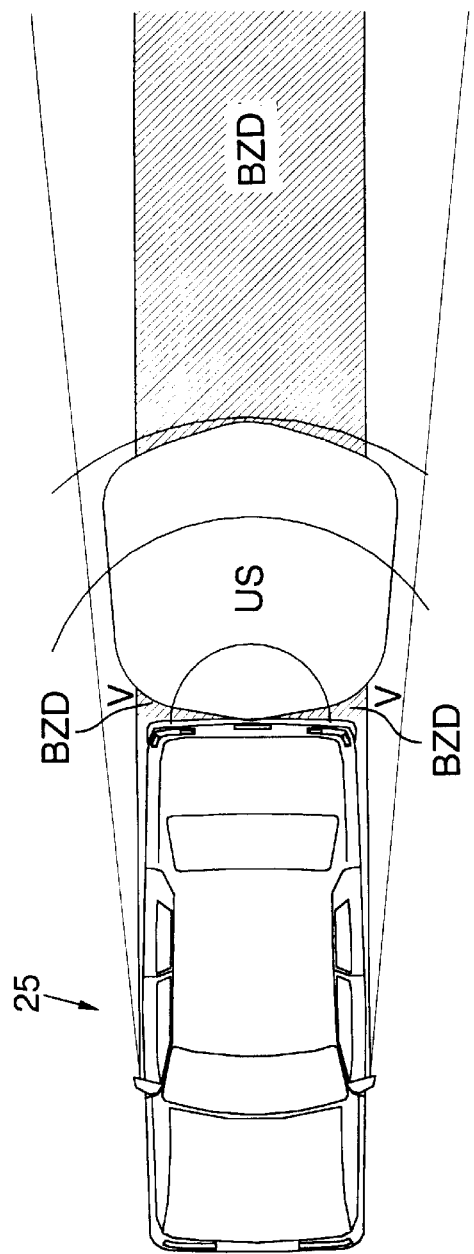

OBSTACLE PROXIMITY WARNING DEVICE FOR VEHICLES

BACKGROUND OF THE INVENTION

1. Field of the Invention

This invention relates to devices for warning a driver when his or her vehicle is approaching an obstacle (or a person), particularly but not necessarily only when backing up.

2. Description of the Prior Art

Devices of the general type are fairly well known. A typical prior art device uses an ultrasonic transmitter and an ultrasonic receiver, and triggers an alarm when a reflected signal from the transmitter of sufficient intensity is received by the receiver. The alarm may be audible, or visual, or both. Devices of this type are known from U.S. Pat. No. 5,574,426 (Shisgal et al.), U.S. Pat. No. 5,650,765 (Park), U.S. Pat. No. 5,764,136 (Harron), U.S. Pat. No. 4,903,004 (Starke et al.), U.S. Pat. No. 3,922,629 (Hayakawa) and U.S. Pat. No. 4,551,722 (Tsuda et al.).

A particular problem with at least some prior art devices is that if they become dirty, snow-covered, or otherwise inoperative, there may be no warning to the driver. The driver may therefore assume that backing up is safe, when in fact there could be an obstacle—or a child—in close proximity to the vehicle.

There is therefore a need for a device which alerts the driver when it is not functioning properly. It would also be desirable for the device to be configured in such a way as to remain as clean and un-obscured as possible, so that instances of inoperability are minimized.

A further problem is the transmission of ultrasonic vibration from the ultrasonic transmitter to adjacent parts of the vehicle. These adjacent parts may then transmit ultrasonic signals of their own, which interferes with the reading of bouncing echoes from the ultrasonic signals transmitted by the transmitter. To minimize this problem, it is known to decrease the sensitivity of the receiver, but this is disadvantageous when it comes to dirt or snow covered transmitters due to the lowered output signal.

SUMMARY OF THE INVENTION

In view of the preceding, it is an object of the invention to provide an improved alarm device which tends to remain relatively clean and unobstructed but will function even with a certain amount of dirt or snow coverage, and which sends an indication to the driver when it is not functioning properly.

It is also an object of the preferred embodiment of the invention to provide a device which functions very effectively when it is in fact functioning, and which provides various alarm options.

In the invention, a first embodiment of an obstacle proximity warning device for vehicles has a single ultrasonic transceiver for sending an ultrasonic signal and receiving the ultrasound reflected by an obstacle, a receiver signal process means connected to the ultrasonic transceiver, to generate trigger signals upon a threshold level signal being received from the ultrasonic transceiver, an alarm means responsive to the trigger signals, a housing in which the ultrasonic transceiver is mounted and a mounting bracket for fixedly mounting the housing to the vehicle. The mounting bracket has a resilient coating adapted to substantially absorb ultrasonic vibrations generated by the ultrasonic transceiver, to prevent the radiation of ultrasonic vibrations from other elements of the vehicle or the mounting bracket.

The receiver signal processing means consists of a pre-amplifier 20, an amplifier (not shown) and a threshold detector (not shown). The pre-amplifier is preferably mounted in the housing together with the ultrasonic transceiver.

The alarm means comprises the amplifier and threshold detector circuits and a control means, for example a microprocessor with related circuitry, for processing the trigger signal from the threshold detector, to permit different types of alarm indications to be generated by the alarm means for different trigger signals.

In a second embodiment of the invention, an obstacle proximity warning device for vehicles has a plurality of ultrasonic transceivers to send an ultrasonic signal and to receive the ultrasound reflected by an obstacle, a plurality of receiver signal process means, one receiver signal processing means being connected to one each of the ultrasonic transceivers, to generate trigger signals upon a threshold level signal being received from the respective ultrasonic transceiver, a common alarm means connected to each one of the plurality of receiver signal process means, the alarm means being responsive to the trigger signals, a plurality of housings for mounting one each of the ultrasonic transceiver in each of the housings, a plurality of mounting brackets for fixedly mounting each one of the housings to a vehicle. The plurality of mounting brackets have a resilient coating adapted to substantially absorb ultrasonic vibrations generated by the ultrasonic transceivers.

Each one of the plurality of pre-amplifiers is preferably mounted in each of the housings together with one ultrasonic transceiver.

The alarm means has a control means, for example a microprocessor with related circuitry, for processing the trigger signal from the ultrasonic transceivers, to permit different types of alarm indications to be generated by the alarm means for different trigger signals.

The device further preferably has a multiplexing means connected to the alarm means. The plurality of amplifier and threshold detector circuits are preferably mounted together in a separate multiplexing housing together with the multiplexing means. Each one of the plurality of ultrasonic transceivers is connected to the multiplexing means, which is configured to cycle through the connections of the plurality of ultrasonic transceivers so that only one of the plurality of ultrasonic transceivers is connected to the alarm means at one time.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which:

FIG. 6A is a schematic side view of a vehicle showing the blind area when the vehicle is equipped with a warning device according to the invention, FIG. 6B is a schematic view from above of a vehicle showing the blind area when the vehicle is equipped with a warning device according to the invention.

DETAILED DESCRIPTION OF THE PREFERRED EMBODIMENT

Figure 3A:
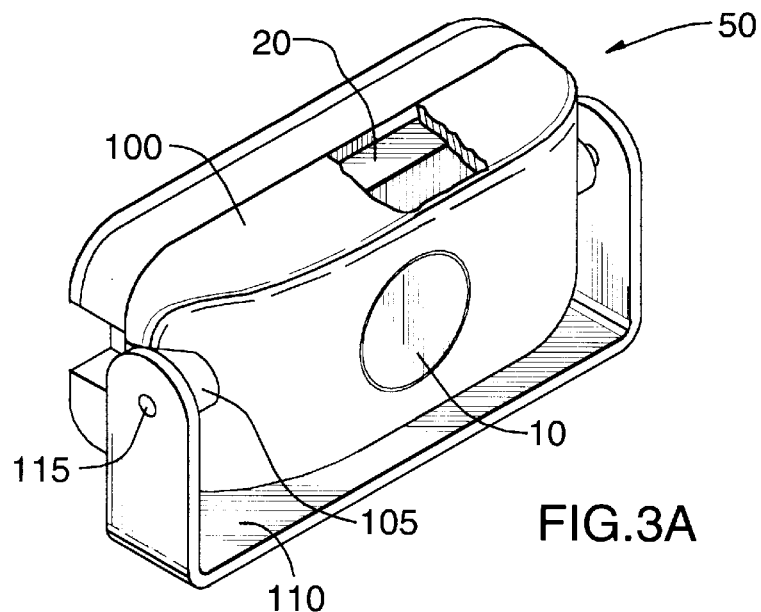
FIG. 3A is a schematic perspective side view of a detector with a mounting bracket according to the invention.
Figure 3B:
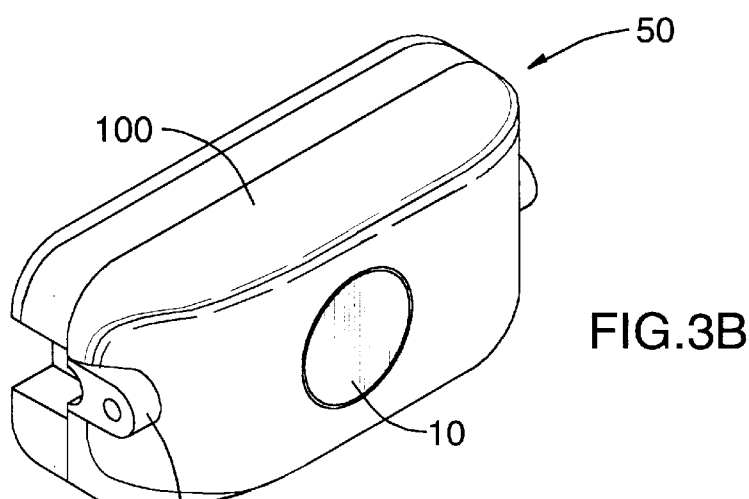
FIG. 3B is a schematic perspective side view of a detector according to the invention.
Figure 3C:
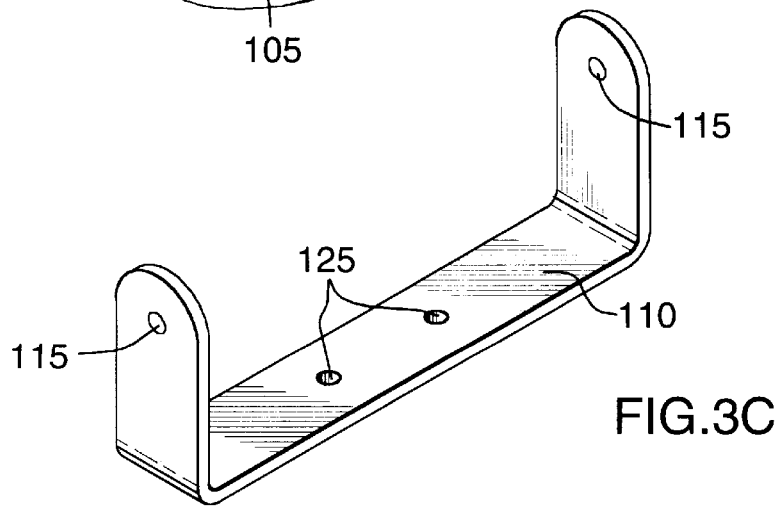
FIG. 3C is a schematic perspective side view of a mounting bracket according to the invention.
Figure 3D:
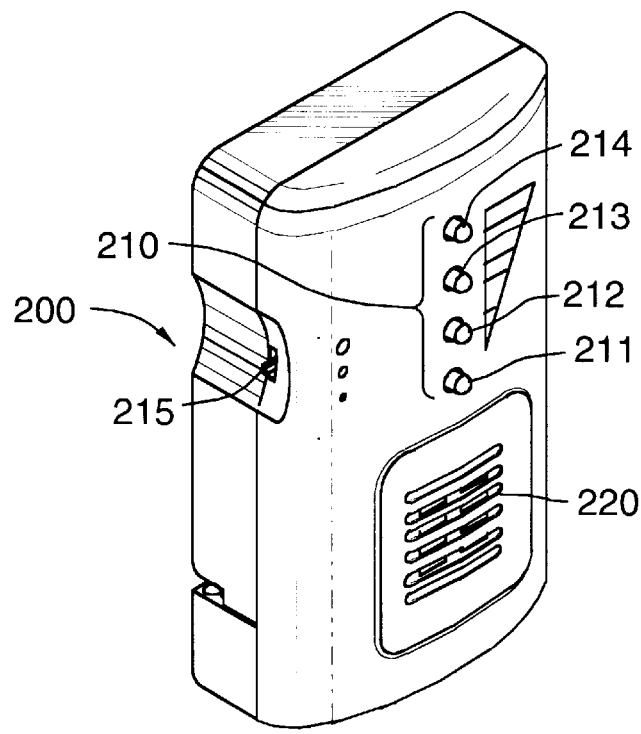
FIG. 3D is a schematic perspective front view of an alarm means according to the invention.
Figure 3E:
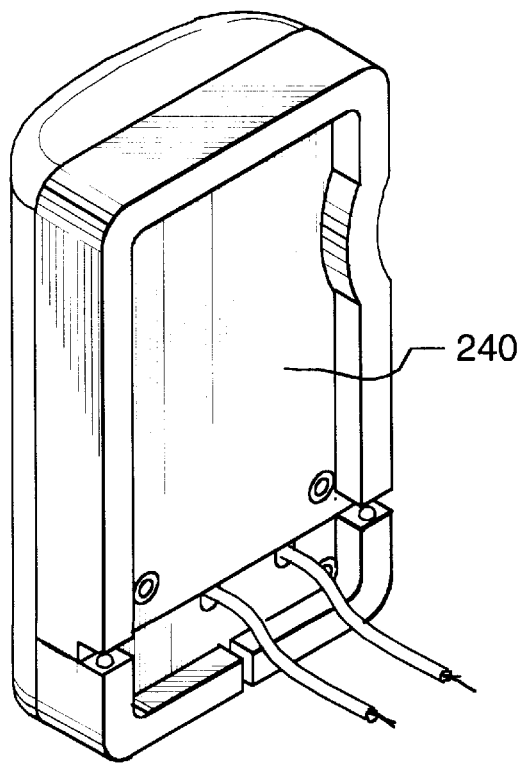
FIG. 3E is a schematic perspective rear view of an alarm means according to the invention.

FIGS. 1 and 3A to E show an obstacle proximity warning device for vehicles according to a first embodiment of the invention, in which a detector housing 100 is held by a mounting bracket 110 in a desired position on a vehicle (see FIGS. 4A through 4D). The bracket is preferably made of stainless steel, but any rugged non-corrosive material may be used. An ultrasonic transceiver 10, arranged to send an ultrasonic signal and to receive the ultrasound reflected by an obstacle, is preferably mounted together with and connected to a receiver signal processing means pre-amplifier 20 inside the housing, thus constituting a detector 50, as shown in FIG. 3B. The housing is preferably waterproof, making the detector resist snow, sleet, rain and carwashes. First mounting means 105 are arranged on at least two sides of the housing 100, for cooperation with second mounting means 115 arranged on the mounting bracket 110, to mount the housing to the bracket. Third mounting means 125 are arranged on the mounting bracket, to mount the bracket to the vehicle. The pre-amplifier 20 inside the housing 100 is connected to an alarm means 200, responsive to the trigger signals. The alarm means comprises amplifier and threshold detector circuits (not shown). The threshold detector generates trigger signals upon a threshold level signal being received from the ultrasonic transceiver. The connection between the receiver signal processing means and the alarm means preferably comprises a receiver pre-amplifier signal output lead 120 and an alarm means signal input lead 140, which are connected via a first connector 130, for example a male/female connector of known type, and a second connector 131 of a complimentary design to the first connector. As shown in FIG. 3D, the alarm means 200 further has visual indication means 210, preferably a plurality of LEDs of different colours, and an audible indication means 220, for providing visual and audible feedback, respectively, to the driver regarding the proximity of detected obstacles. A volume control 215 is preferably provided forth audible feedback, so that the total volume of the signal may be regulated from full volume to a lower volume. The audible signal may not be turned off completely for safety reasons. Preferably, the visual indication means comprise one first light indicator 211, such as a green LED or lightbulb, and a second light indicator 212, such as a red LED or lightbulb, a third light indicator 213, such as a red LED or lightbulb, and a fourth light indicator 214, such as a red LED or lightbulb. The sequence of lighting the indicators is first the fourth indicator, then the fourth and third indicator and finally, for serious warning, the second, third and fourth indicators. The first light indicator indicates that power is applied to the unit, and remains switched on while the unit is activated. The alarm means 200 preferably has a recessed back 240, as is shown in FIG. 3E, which makes it possible to fasten the alarm means flush to the inside of the vehicle. The alarm means thus does not protrude from the inner surface leaving a gap between the alarm means and the inner surface.

The mounting bracket 110, as shown in FIG. 3C, for fixedly mounting the housing to the vehicle, has a resilient coating covering at least part of the bracket. The covering is adapted to substantially absorb ultrasonic vibrations generated by said ultrasonic transceiver, thus preventing the vibrations to spread to adjacent vehicle parts where the vibrations may be radiated and cause false indications picked up by the ultrasonic transceiver 10 and the receiver signal processing means 20. Alternatively, the housing 100 is held in the bracket 110 by resilient fastening means (not shown), such as rubber pads with threaded mounting screws. This arrangement requires more space and may not work as well as the resilient coating on the mounting bracket.

The alarm means 200 further has control means (not shown), for example a microprocessor with the associated circuits, for processing the trigger signal from the threshold detector circuit, to permit different types of alarm indications for different trigger signals.

Figure 4A:
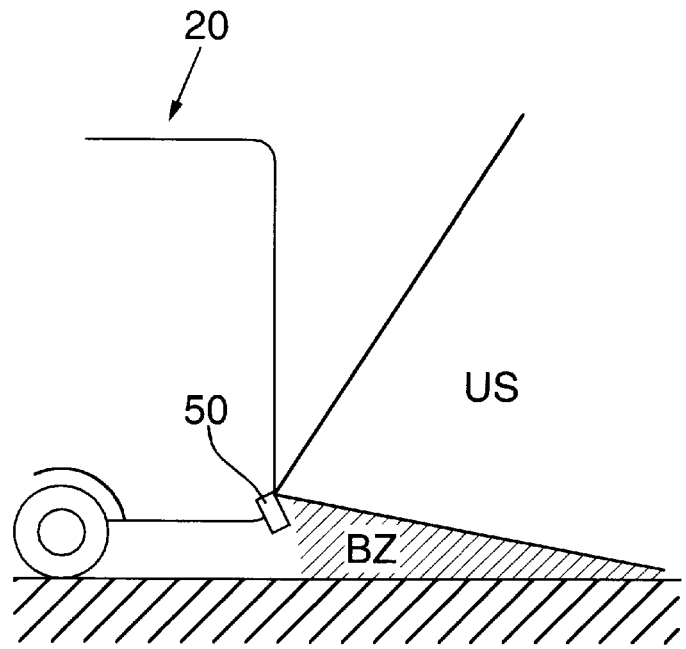
FIG. 4A is a schematic partial side view of a vehicle showing a first preferred location of the detector.
Figure 4B:
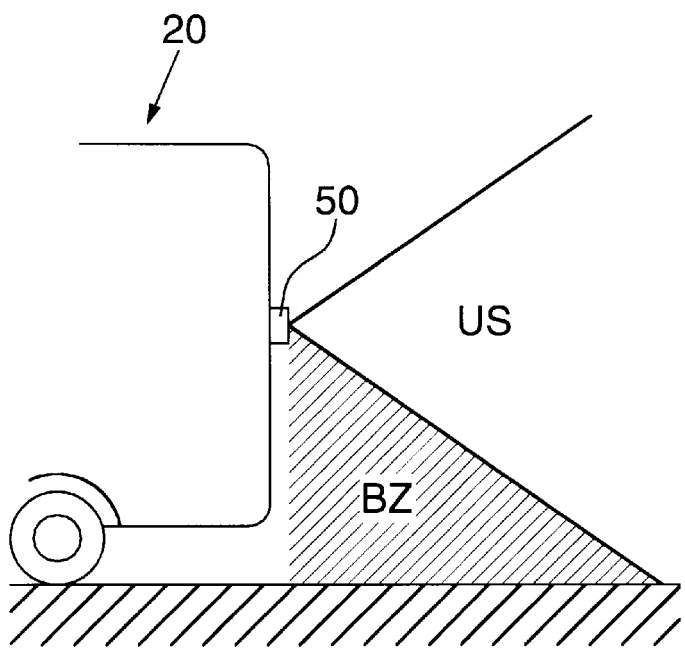
FIG. 4B is a schematic partial side view of a vehicle showing an alternative location of the detector.
Figure 4C:
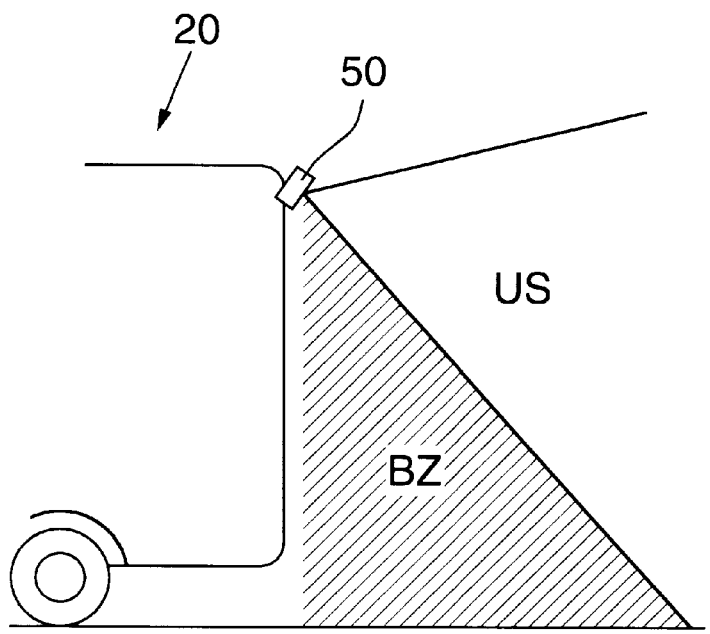
FIG. 4C is a schematic partial side view of a vehicle showing a further alternative location of the detector.
Figure 4D:
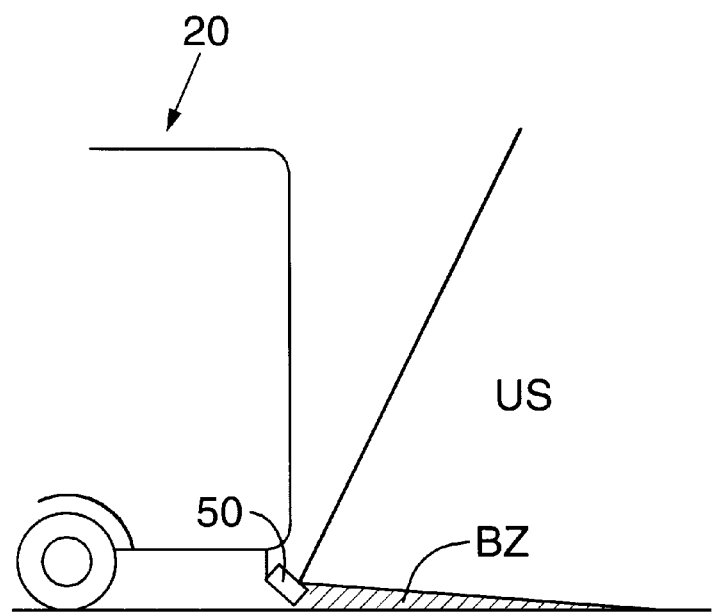
FIG. 4D is a schematic partial side view of a vehicle showing a further preferred location of the detector.

In FIGS. 4A to D, different possible mounting locations for the detector 50 on a vehicle 20 are shown. The ultrasonic field generated by the detector is generally designated US and the resulting blind zone, where the obstacle proximity warning device cannot sense any obstacles, is generally denoted BZ. A first preferred location for the detector is shown in FIG. 4A, where the detector 50 is mounted in a low position at the rear of the vehicle 20. Two possible locations for the detector are shown in FIGS. 4B and 4C, but it is obvious that the blind zone BZ increases in size for these locations of the detector. The optimal location for the detector 50 is shown in FIG. 4D, where the detector is mounted as low as possible under the vehicle 20. This location will make the detector more vulnerable to damage from irregularities in or on the road/street surface, but will create the smallest blind zone.

Figure 5A:
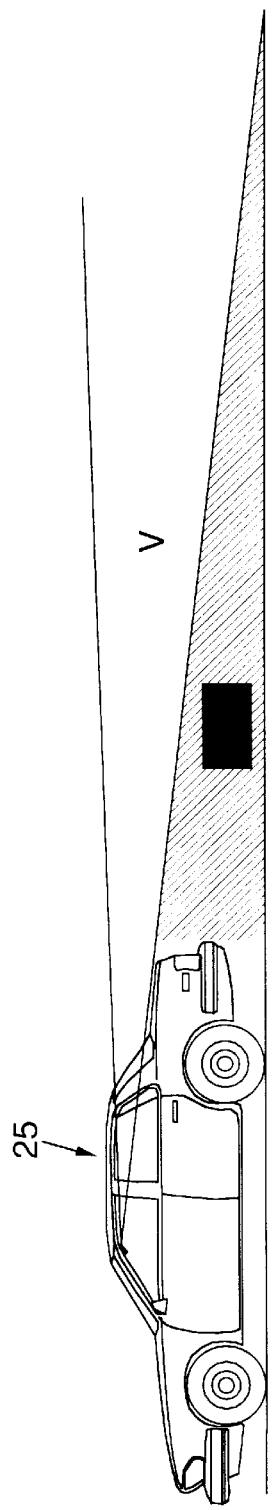
FIG. 5A is a schematic side view of a vehicle showing the blind area when the vehicle is not equipped with a warning device according to the invention.
Figure 5B:
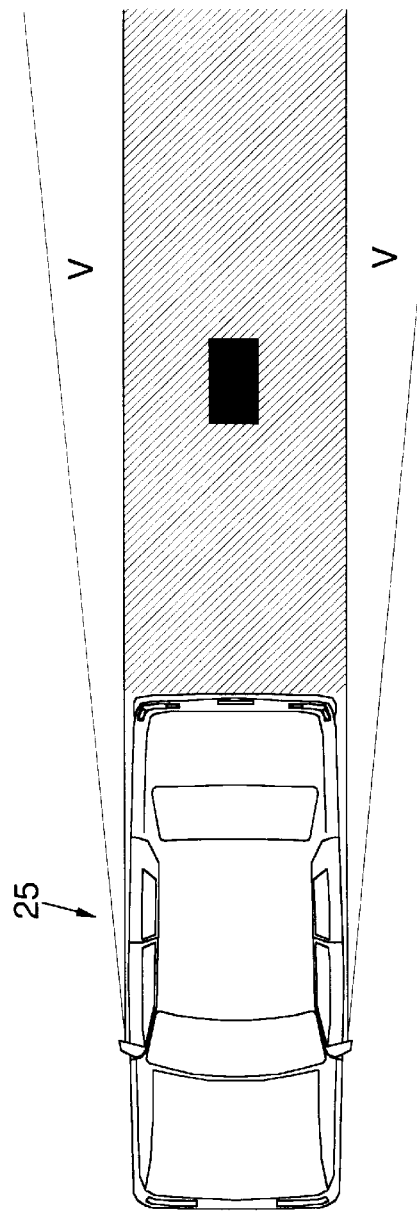
FIG. 5B is a schematic view from above of a vehicle showing the blind area when the vehicle is not equipped with a warning device according to the invention.

As shown in FIGS. 5A and 5B, without an obstacle proximity warning device mounted behind a vehicle, the driver of a vehicle 25 will experience a driver blind zone, generally designated BZD. The driver blind zone is the area the driver cannot see directly behind the vehicle, when the driver turns around inside the vehicle to reverse the same. The driver blind zone BZD may stretch substantially behind the vehicle, depending upon the actual construction of the vehicle rear window etc. The area the driver can see, when looking through the rear window of the vehicle 25, is generally designated V.

A vehicle similar to the one shown in FIGS. 5A and 5B, but with an obstacle proximity warning device mounted behind the vehicle, is shown in FIGS. 6A and 6B. As is evident, the driver blind zone BZD immediately behind the car is drastically smaller than that shown in FIGS. 5A and 5B, because the combination of the driver viewing area V and the ultrasonic field generated by the detector US is larger than the driver viewing area alone. Due to the limited range of the device, the driver cannot rely on the device to sense objects far away in the driver blind zone, but that is usually irrelevant when reversing a vehicle.

Figure 7:
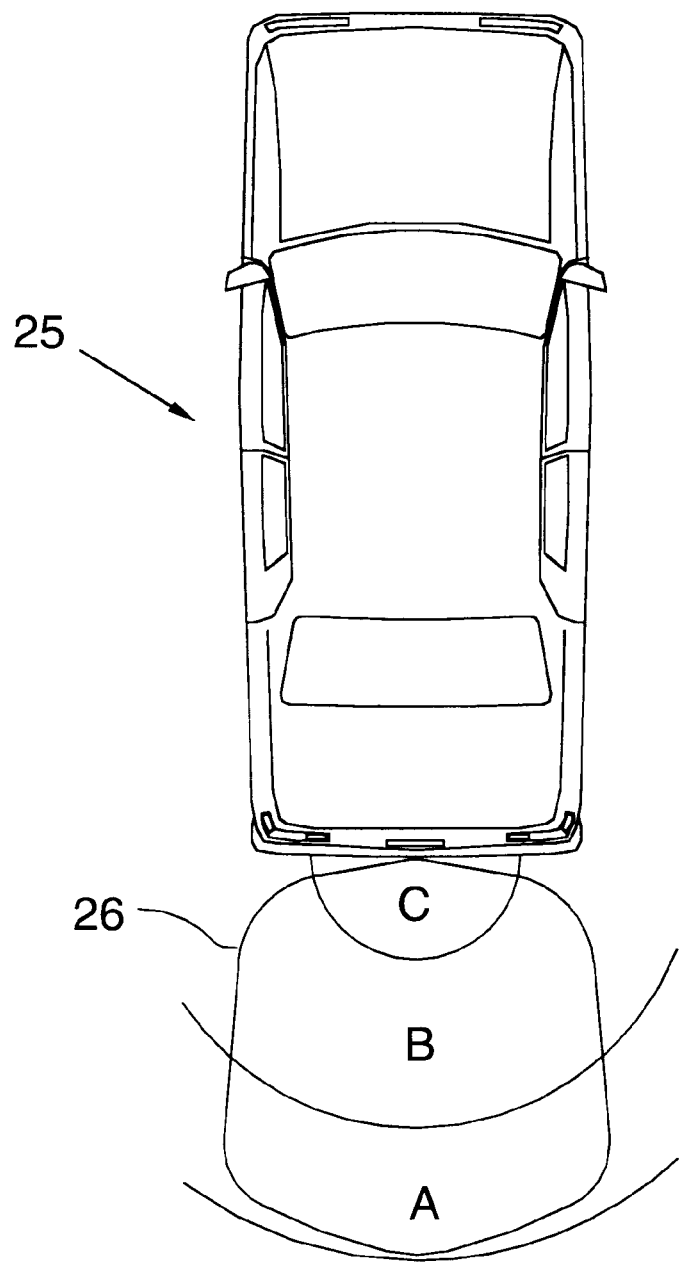
FIG. 7 is a schematic view from above of a vehicle showing the different detection zones of the warning device according to the invention.

The obstacle proximity warning device for vehicles according to the invention is arranged to provide a multitude of operational benefits. The power for the electronics, visual and audible means are taken from the reverse lights of the vehicle, ensuring that the device is only operative during reversing of the vehicle. When the detector 50 senses an object within its range, a signal is sent to the alarm means 200, which is preferably mounted inside the vehicle in a position where the driver can see the alarm unit during reversing manoeuvres. The control means of the alarm means interprets the signal to provide visual and audible warnings to the driver of the vehicle. The warnings tell the driver that there is an obstacle behind the vehicle, and how far it is from the rear of the vehicle. As the vehicle approaches the obstacle, the warnings become more intense, the visual warning will either flash or have a red colour, or both, and the audible warning may rise in pitch and/or volume. The obstacle proximity warning device measures the distance to the obstacle and divides the distance into a plurality of zones, for example 2.2 m, 1.6 m and 0.6 m. The zones are shown in FIG. 7. Each zone is represented by a separate visual indicator, such as a green, yellow or red LED, on the alarm means 200. The indication is preferably arranged in the following way, with reference to FIG. 7:

Zone A, an object detected between 2.2 and 1.6 m from the sensor. The fourth light indicator 214 (see FIG. 3D), preferably a red or yellow/orange LED, is switched on and a lower pitch or lower volume beep is sounded.

Zone B, an object detected between 1.6 and 0.6 m from the sensor. The third light indicator 213, preferably a red LED, is switched on, together with the fourth light indicator 214, and a medium pitch or medium volume beep is sounded.

Zone C, an object detected at less than 0.6 m from the sensor. The second light indicator 212, preferably a red LED, is switched on, together with the fourth and third light indicators, 214 and 213, respectively, and a higher pitch or higher volume beep is sounded.

It is preferable to keep an LED for a previous zone switched on and let it stay on also when a zone for closer indication is switched on, because this minimizes the risk of misinterpreting the readout. If only a single LED would be switched on for any given zone indication, the position of the LED relative to the casing of the alarm means 200 would be the only indication to which zone was being indicated.

Figure 8:
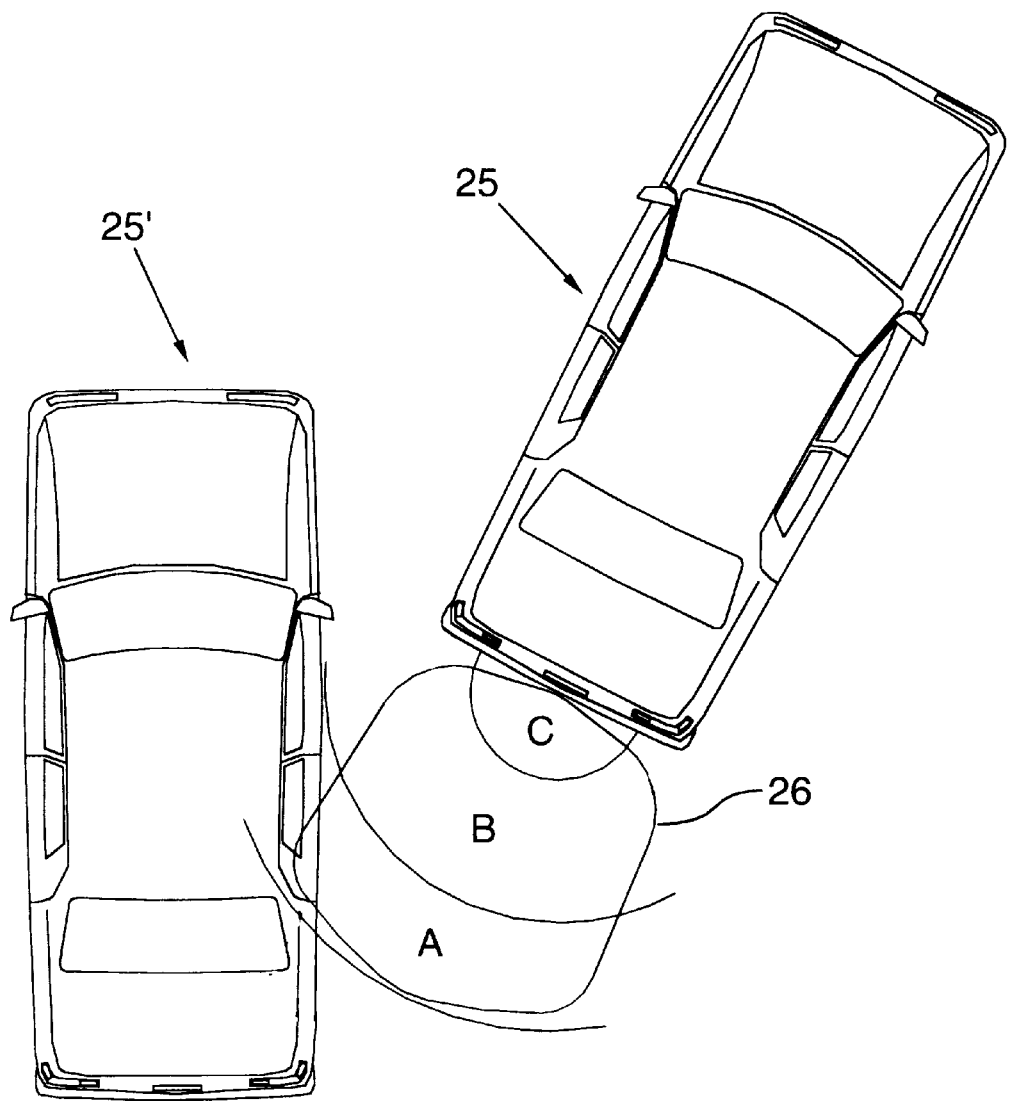
FIG. 8 is a schematic view from above of a vehicle equipped with a warning device according to the invention, showing the detection zones of the warning device according to the invention with respect to a detected obstacle.

In FIG. 8, a vehicle 25 equipped with an obstacle proximity warning device according to the invention, is shown backing up at an angle towards a parked vehicle 25'. Due to the wide angle of detection, the device is able to provide accurate information about the distance to the parked vehicle.

The obstacle proximity warning device is also arranged to audibly and visually confirm that it is operational every time the device is switched on, i.e. the reverse of the vehicle is engaged. This may be performed by lighting the first light indicator, preferably a green LED, and sounding a short audible tone. This indication is delayed, for example 1 second, to prevent the un-intentional indication when the gear change lever passes the reverse position on its way to either drive or park for an automatic transmission.

If the detector 50 is too dirty or covered to perform its function, the obstacle proximity warning device is arranged to emit a special non-functioning alarm, for example flashing all visual indicators and continuously beep the audible alarm.

A volume control (not shown) is provided on the alarm means 200, but the sound can not be completely switched off to prevent the unintentional disabling of the audible warning.

The ultrasonic transceiver most preferably used is of the type MUR-MA40E9-1 manufactured by Murata Manufacturing Co, Ltd. This transceiver has a flat front face, which is the sound generating and receiving face, making it easy to keep clean. The transceiver further has a wide angle of sound distribution, about 150° laterally and 60° vertically, depending upon humidity and temperature. The distance may be measured within ±10 cm. No horn construction is necessary for shaping the ultrasonic sound cone emanating from this sensor.

Figure 1:
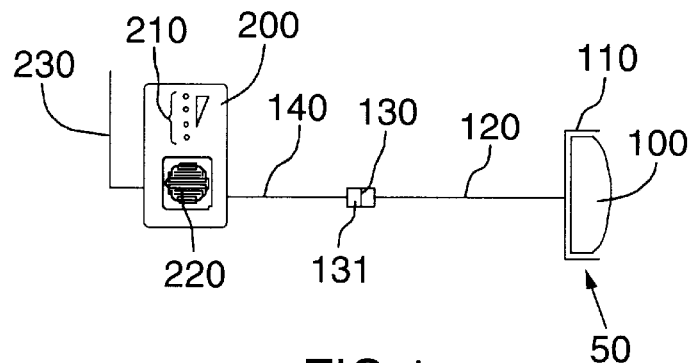
FIG. 1 is a schematic view of a warning device according to a first embodiment of the invention.
Figure 2:
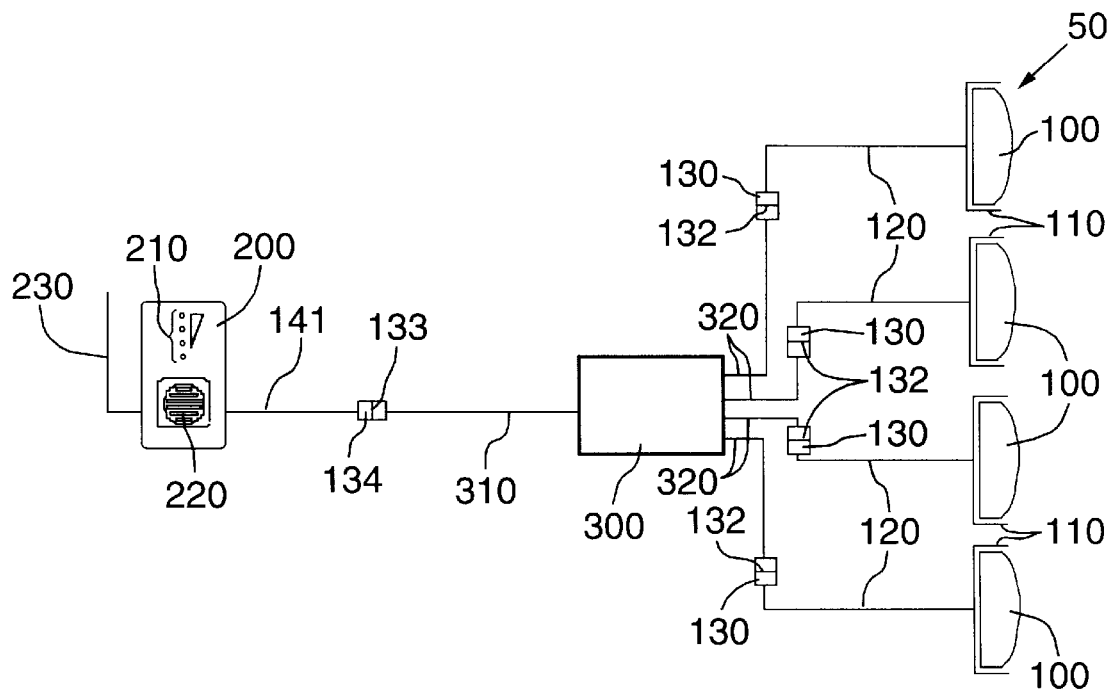
FIG. 2 is a schematic view of a warning device according to a second embodiment of the invention.

A second preferred embodiment of the invention is shown in FIG. 2. A plurality of detectors 50, held by corresponding mounting brackets 110 (see FIG. 3C) in desired positions on a vehicle (not shown), are used, each detector containing an ultrasonic transceiver 10 and a receiver signal processing means pre-amplifier 20 in a housing 100, as described above in connection with FIGS. 3A and 3B. Each pre-amplifier is connected to a multiplexing unit 300 via the corresponding pre-amplifier signal output lead 120, the corresponding first connector 130 and a multiplexing input lead 320 having a third connector 132 of the same type as the second connector 131. There are, thus, a plurality of multiplexing input leads connected to the multiplexing unit 300, one for each detector 50. The multiplexing unit comprises amplifiers, threshold detectors and other electronic circuits which connect one detector at the time to the input of the multiplexing unit. The multiplexing unit 300 is connected to the alarm means 200 via the alarm means signal input lead 141 and a multiplexing output lead 310, which are connected via a fourth connector 134. The trigger signal from the multiplexing unit is connected directly to the control means of the alarm means 200, via the alarm means signal input lead 141. The alarm means, in this embodiment, thus does not contain the amplifier and threshold detector circuits.

A problem, cause and solution table for an obstacle proximity warning device according to the invention would thus comprise the following:

| Problem | Probable cause | Solution |
|---|---|---|
| All LEDs flash continually | Object too close to sensor | Remove object |
| | Sensor is dirty | Clean sensor |
| | Sensor angled down too far | Readjust sensor |
| No startup indications | Connection failure | Check power connection |
| | | Check reverse lights for function |
| | | Check connections |
| LEDs working but no sound | Volume too low | Check volume control |
| | Sound generating means failed | Check sound generating means |
| Sound working but not one or more LEDs | One or more LEDs failed | Replace alarm means |

The control means, for example a microprocessor with associated circuits, in the alarm means 200 performs three basic functions: Power Up, Sensing, and Alarm.

Figure 9:
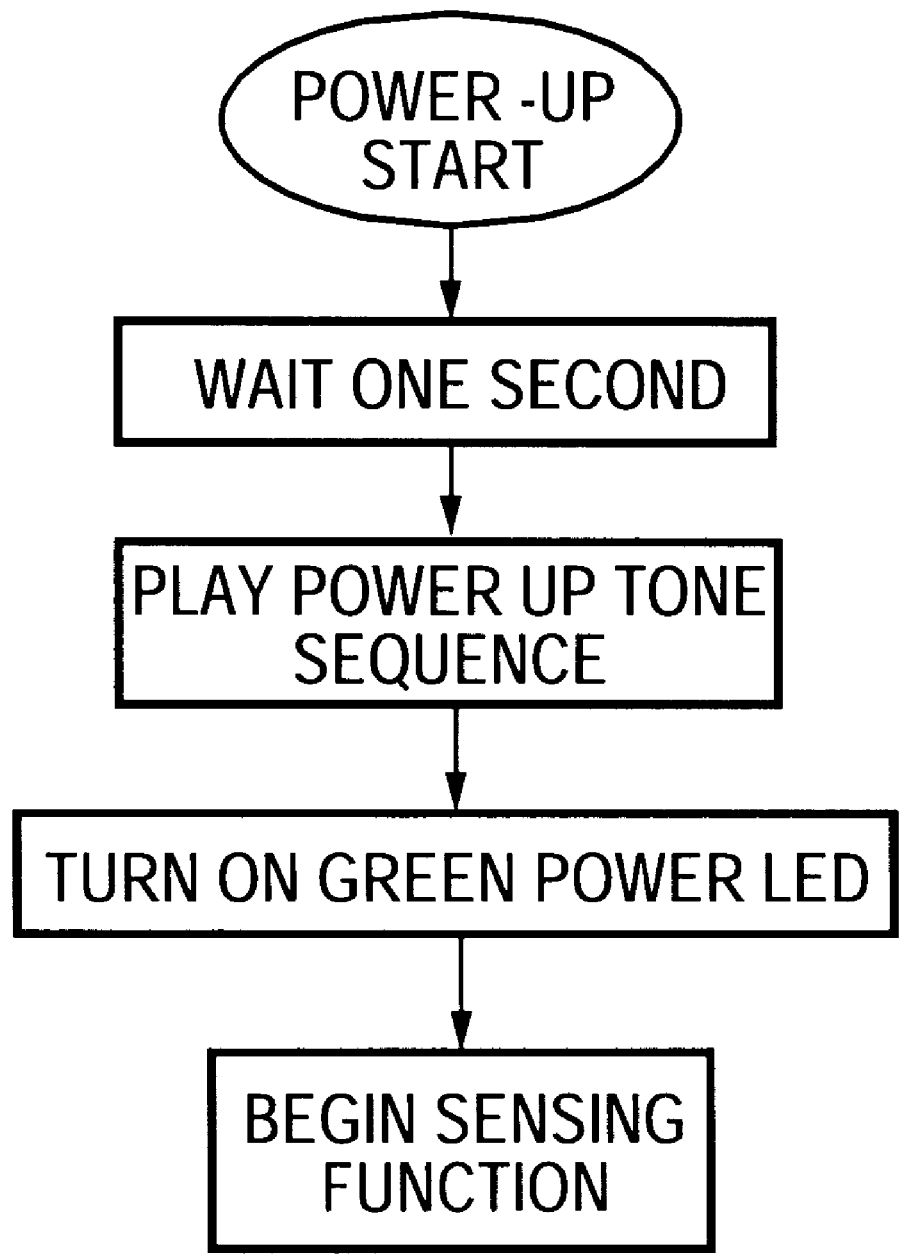
FIG. 9 is a flow diagram showing the power-up sequence of a warning device according to the invention.

Power Up:

On Power Up the microprocessor waits a set time period, for example 1 second, and then plays a Power Up tone sequence to confirm to the user that the device is activated, as shown in FIG. 9. The green power LED is then activated and the sensing function is engaged.

Figure 10:
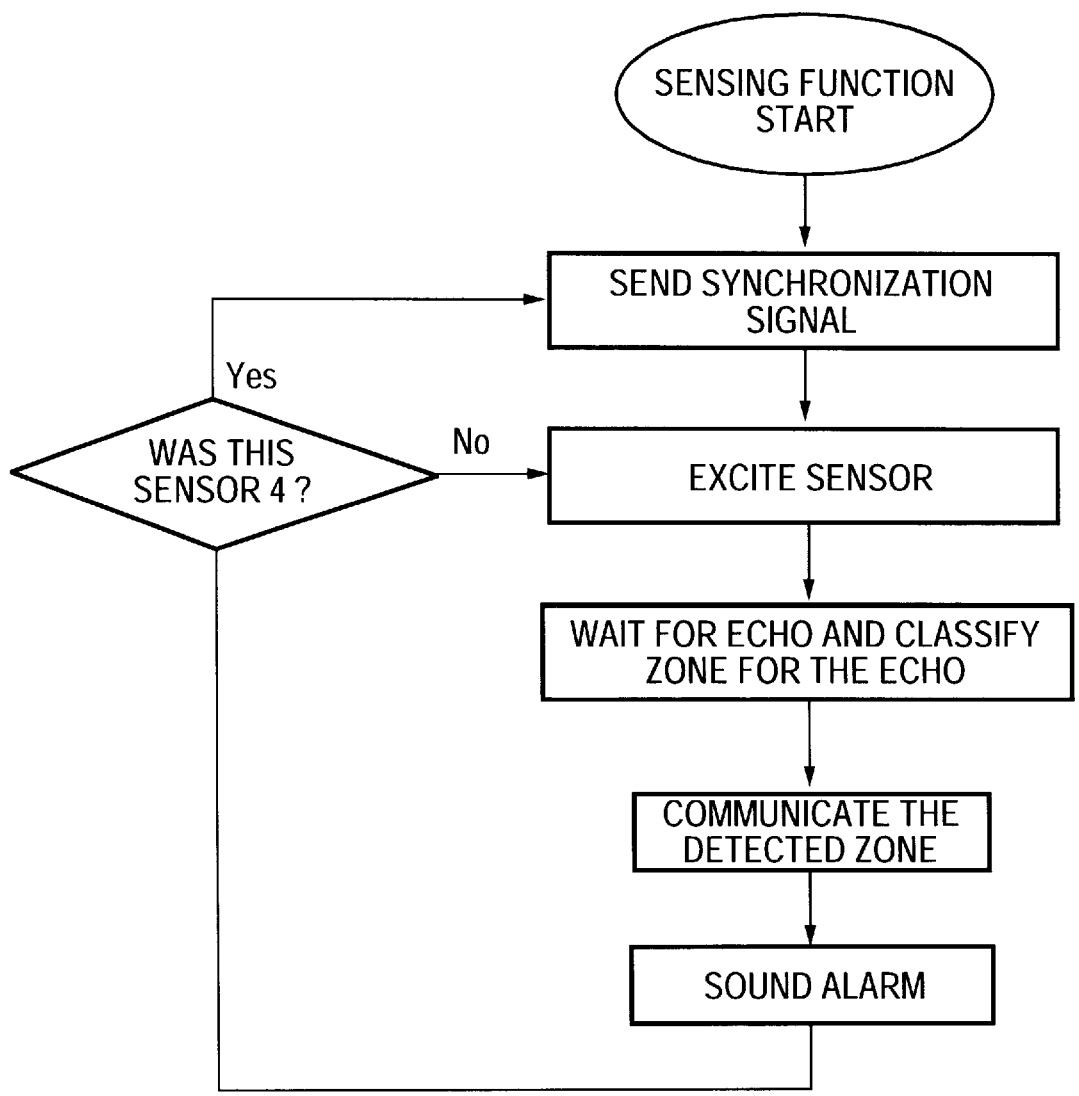
FIG. 10 is a flow diagram showing the normal operation sequence of a warning device according to the invention.
Figure 11A:
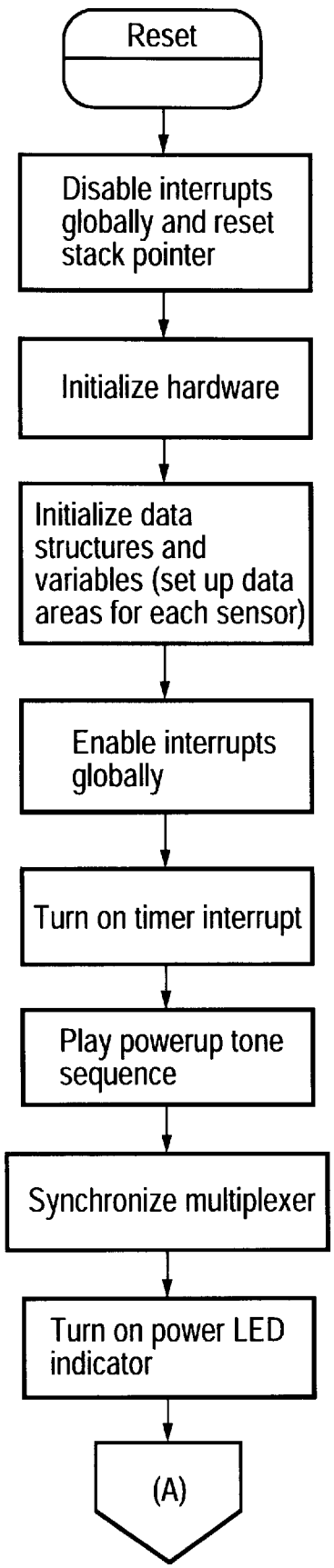
FIGS. 11A–G is a flow diagram showing the operational sequence in detail of a warning device according to the invention.
Figure 11B:
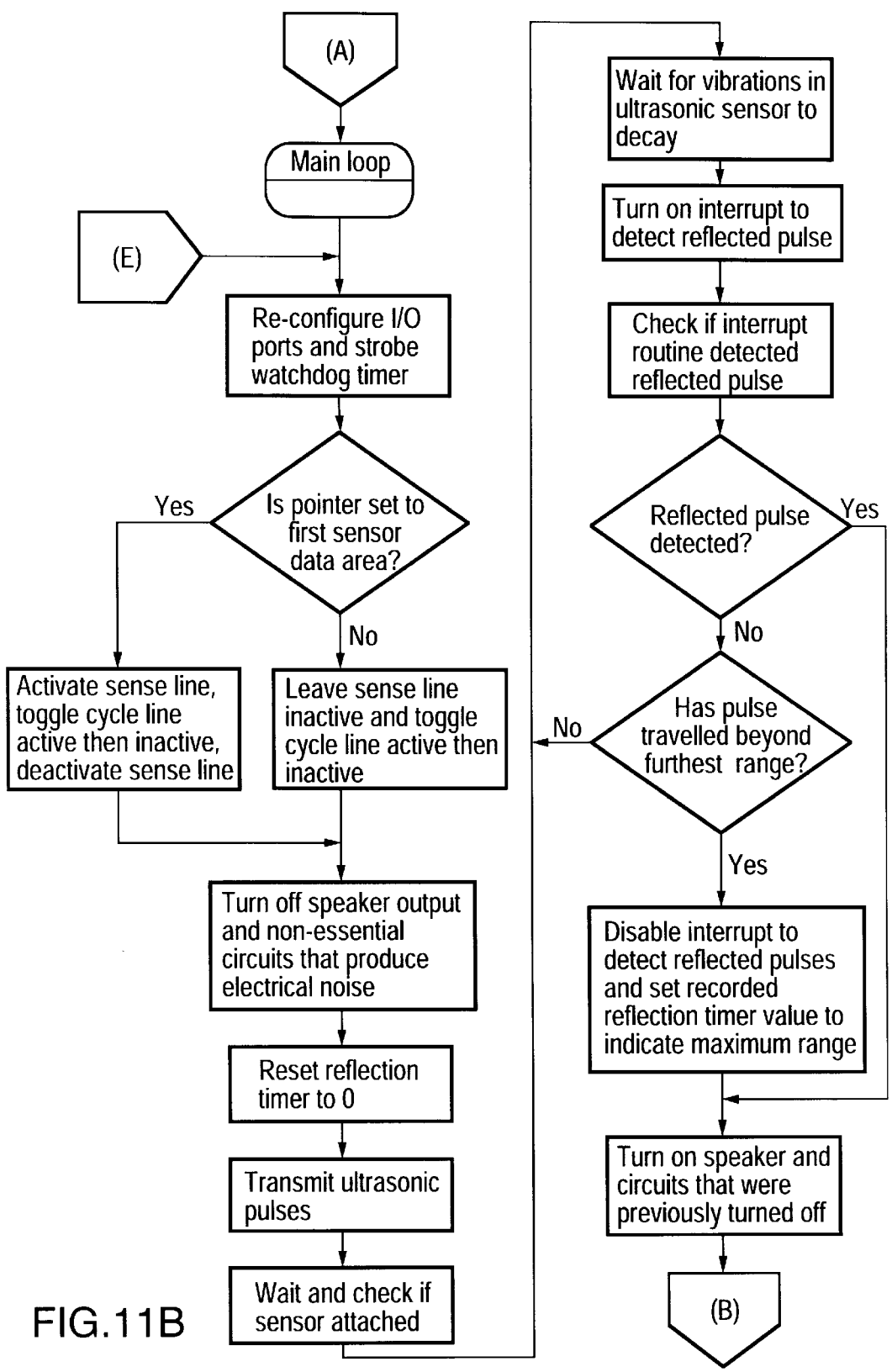
Figure 11C:
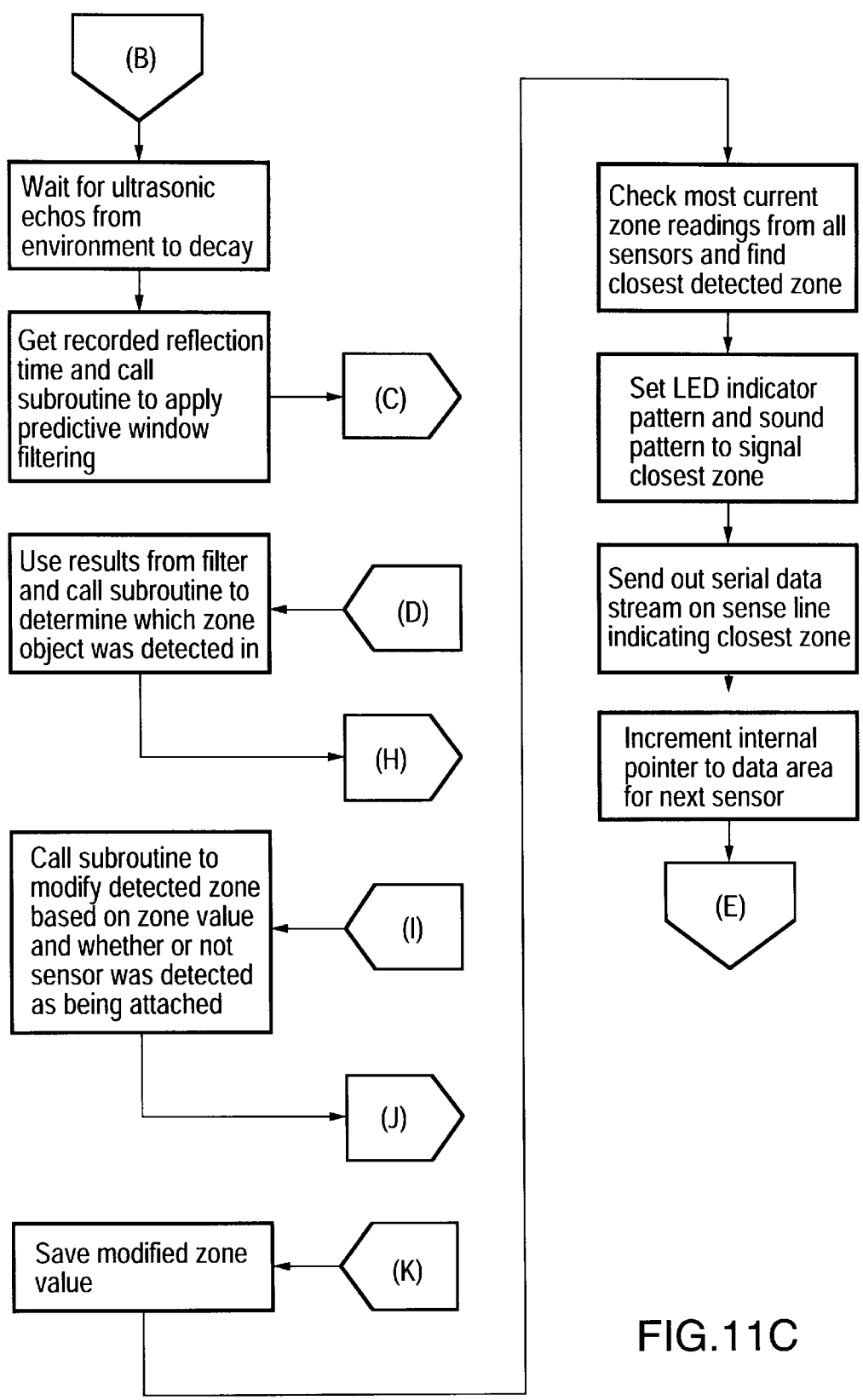
Figure 11D:
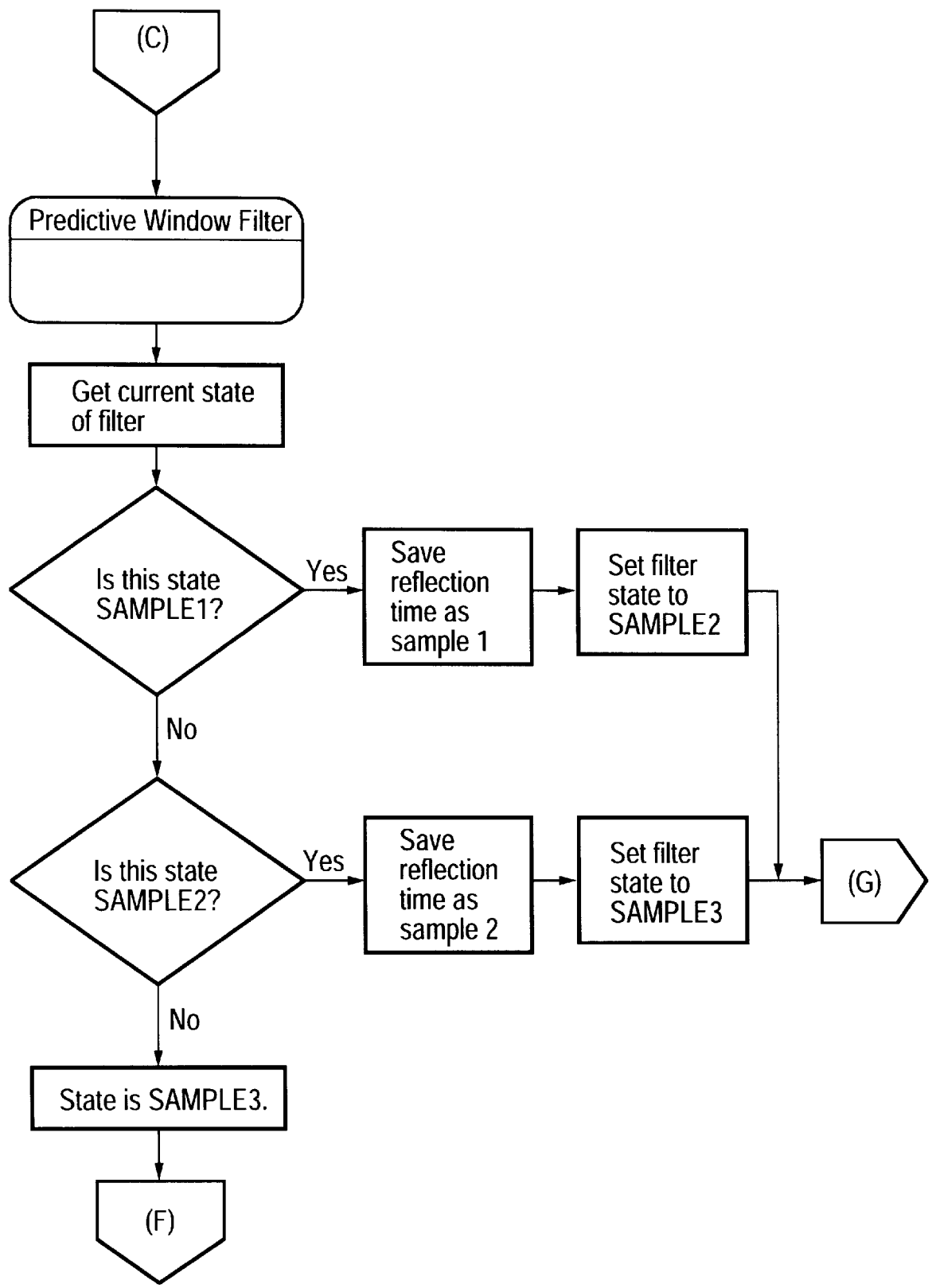
Figure 11E:
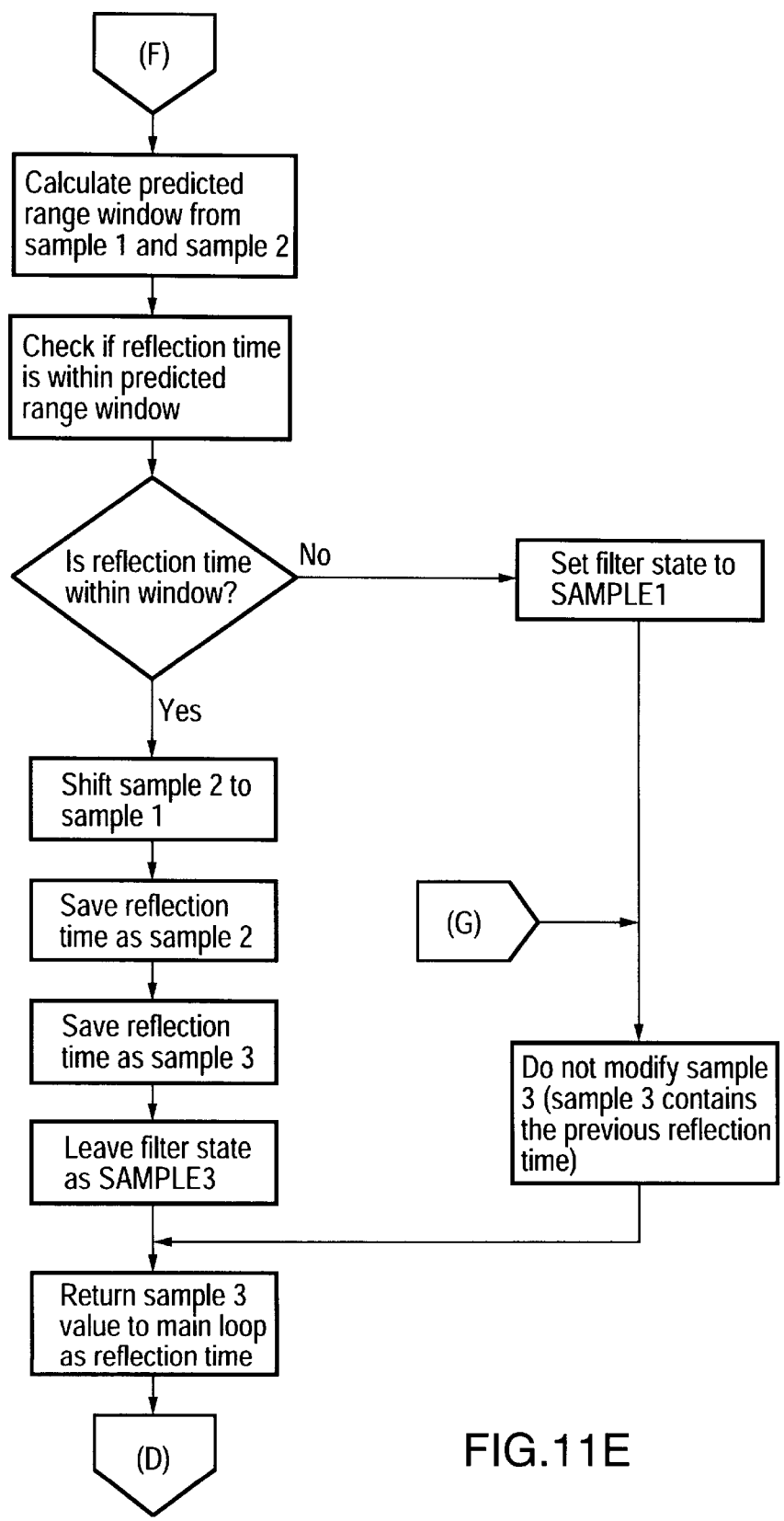
Figure 11F:
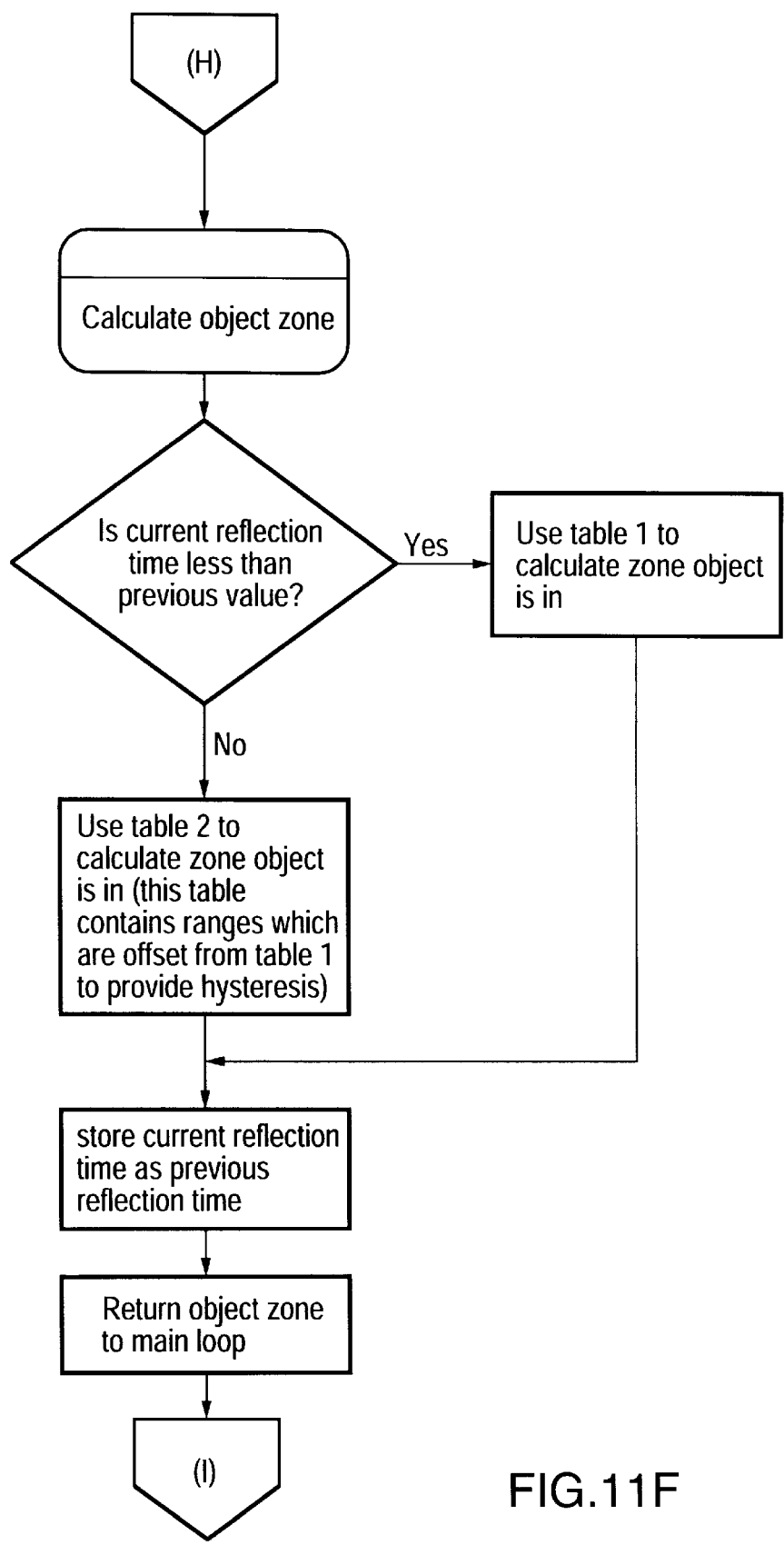
Figure 11G:
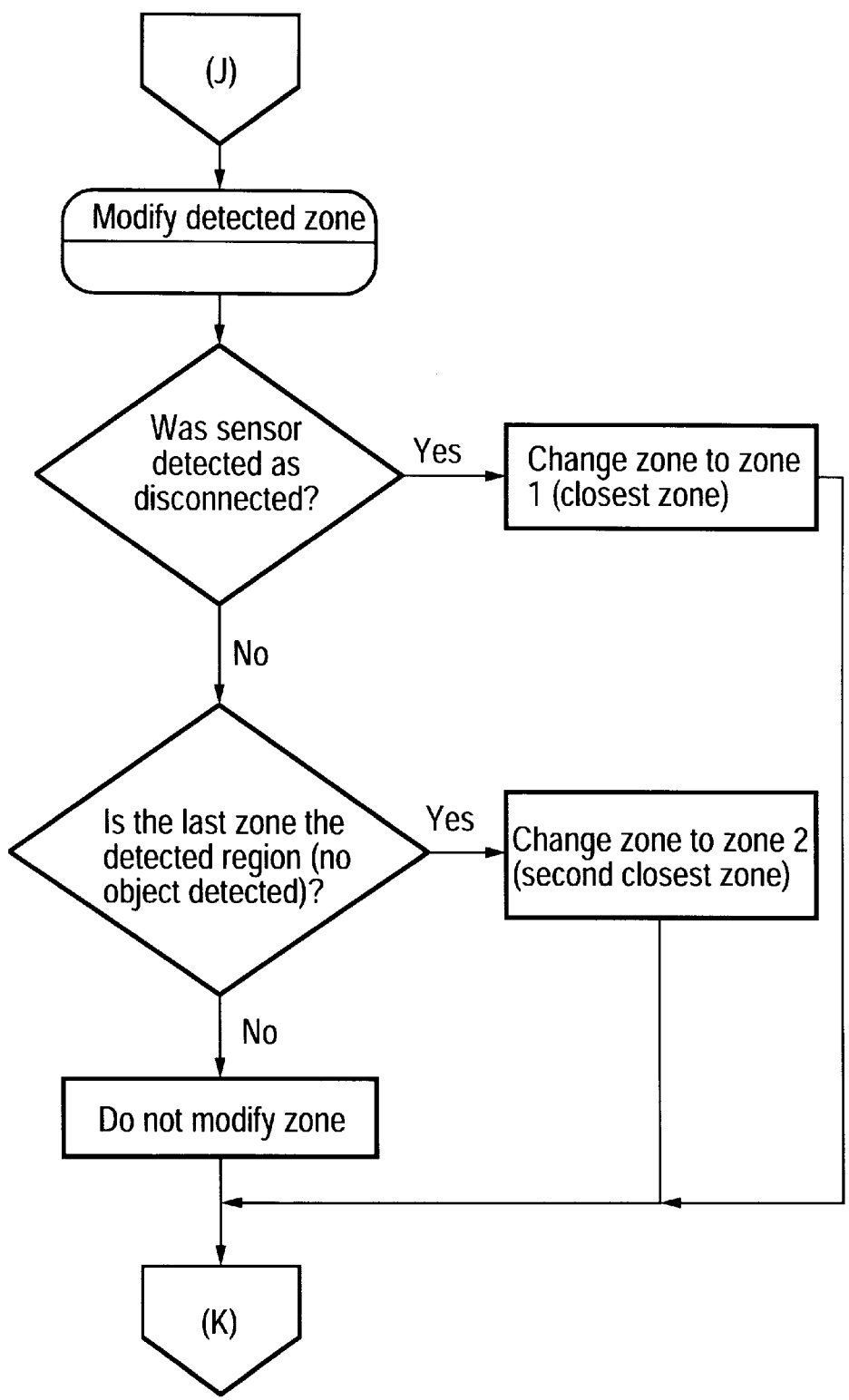

Sensing:

The sensing function determines the distance that an object is from a detector 50. The function begins by sending a synchronization pulse, as shown in FIG. 10, indicating to the multiplexing unit 300 (if attached), that the first detector is being probed. The first detector is then excited with a sequence of 40 KHz pulses, and a zone sensing operation is invoked. The zone sensing operation waits for an echo, and validates that the received echo is actually a valid echo. This is done using a predictive window filtering scheme, which uses the previous two echoes detected with that sensor to verify that the latest received echo actually falls in a window of time that corresponds to the rate of change in the previously measured two echoes. If the latest echo is valid, then the predictive window is shifted to reflect the new object position, and the object position is categorized into one of six possible zones (not to be confused with the zones A to C used for indication of the object distance):

Zone 1: sensor disconnect zone, 1 millisecond after the first 40 KHz pulse

Zone 2: less than or equal to 0.6 meters (corresponding to Zone C)

Zone 3: greater than 0.6 meters but less than or equal to 1.6 meters (corresponding to Zone B)

Zone 4: greater than 1.6 meters but less than or equal to 2.2 meters (corresponding to Zone A)

Zone 5: greater than 2.2 meters but less than or equal to 3.5 meters

Zone 6: greater than 3.5 meters, default if no echo is detected on Zones 2 to 5

If Zone 1 is detected, then the control means continues to look for an echo in Zones 2 to 6. The appropriate Zone (2, 3, 4, 5, or 6) is then saved in a Zone table. If Zone 1 is not detected, then the sensor is not operating properly and the Zone table entry is set to Zone 1. If the sensor is dirty, including ice buildup on the sensor, a continuous echo is detected, causing the appropriate Zone to be determined as Zone 2. The process then repeats for detectors 2, 3 and 4.

Alarm:

Each time a detector echo is sensed and classified into its appropriate Zone, a serial data stream is sent out to the multiplexing unit 300 (if attached) to indicate what Zone was detected by that detector. The Zone table entry for that specific detector is then compared with the closest detected Zone from the previous set of four detector readings. The closest Zone is updated immediately if the newly detected Zone is closer than the previous 'closest Zone'. An audio and visual alarm is sounded according to the 'closest Zone' value:

Closest Zone=Zone 1: Alarm 1 (broken sensor audio tone plus all three red LEDs on).

Closest Zone=Zone 2: Alarm 2 (HI alert audio tone plus all three red LEDs on).

Closest Zone=Zone 3: Alarm 3 (MED alert audio tone plus two red LEDs on).

Closest Zone=Zone 4: Alarm 4 (LO alert audio tone plus one red/yellow LED on).

Closest Zone=Zone 5: Alarm 5 (no audio tone plus no red LEDs on).

Closest Zone=Zone 6: Alarm 5 (misaligned sensor audio tone plus all three red LEDs on).

Figure 12:
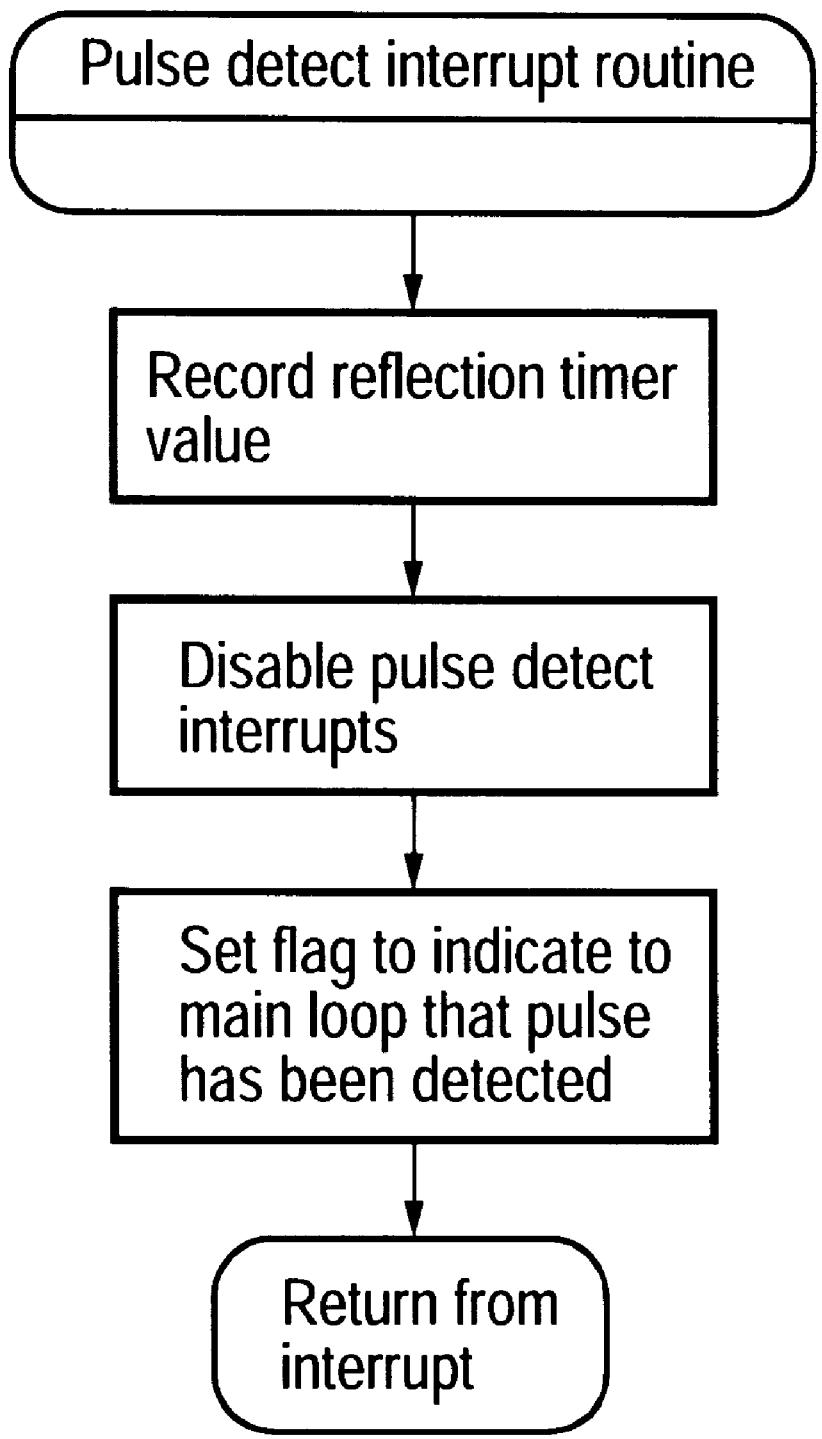
FIG. 12 is a flow diagram showing the pulse detect interrupt routine sequence of a warning device according to the invention.
Figure 13:
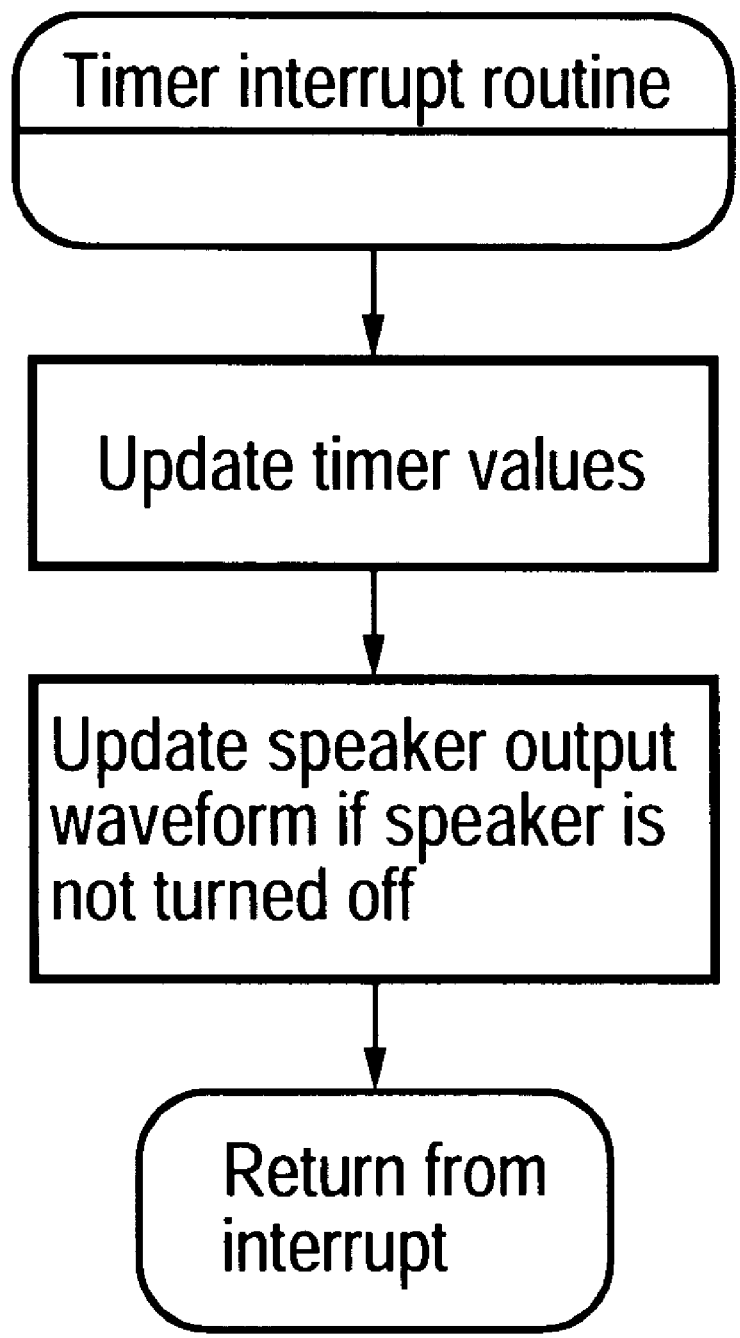
FIG. 13 is a flow diagram showing the timer interrupt routine sequence of a warning device according to the invention.

A more detailed flow chart describing the function of the control means in the alarm means 200 is shown in FIGS. 11A to 11G. In FIG. 12, a flow chart of the pulse detect interrupt routine is shown and in FIG. 13 a flow chart of the timer interrupt routine is shown. These interrupts are called by the program described in the flow chart of FIGS. 11A to 11G.

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed is:

1. An obstacle proximity warning device for vehicles, comprising:

an ultrasonic transceiver to send an ultrasonic signal and to receive the ultrasound reflected by an obstacle;

a receiver signal process means pre-amplifier connected to said ultrasonic transceiver;

an amplifier connected to said pre-amplifier;

a threshold detector connected to said amplifier, said threshold detector being arranged to generate trigger signals upon a threshold level signal echo being received from said ultrasonic transceiver;

an alarm means responsive to said trigger signals;

a housing in which said ultrasonic transceiver is mounted;

a mounting bracket for fixedly mounting said housing to the vehicle; where said mounting bracket has a resilient coating adapted to substantially absorb ultrasonic vibrations generated by said ultrasonic transceiver, and where said alarm means comprises a control means for processing said trigger signal from said threshold detector, to permit different types of alarm indications for different trigger signals, said control means comprising a microprocessor with associated circuits, said microprocessor running a predictive window filtering scheme program using two previous said echoes detected with said transceiver to verify that a latest received echo falls in a window of time that corresponds to a rate of change in said previous two echoes, and if said latest echo is valid, then said predictive window is shifted to reflect a new object position.

2. An obstacle proximity warning device according to claim 1, where said pre-amplifier is mounted in said housing together with said ultrasonic transceiver.

3. An obstacle proximity warning device according to claim 1, where said alarm means comprises a control means for processing said trigger signal from said threshold detector, to permit different types of alarm indications for different trigger signals.

4. An obstacle proximity warning device for vehicles, comprising:

- a plurality of ultrasonic transceivers to send an ultrasonic signal and to receive the ultrasound reflected by an obstacle;
- a plurality of receiver signal process means pre-amplifiers, one pre-amplifier being connected to one of said ultrasonic transceivers;
- a plurality of amplifiers connected to said pre-amplifiers;
- a plurality of threshold detectors connected to said amplifiers, said threshold detectors being arranged to generate trigger signals upon a threshold level signal being received from said ultrasonic transceivers;
- a common alarm means connected to each one of said plurality of threshold detectors, said alarm means being responsive to said trigger signals;
- a plurality of housings for mounting one of said each at least one ultrasonic transceiver in each of said housings;
- a plurality of mounting brackets for fixedly mounting each one of said housings to a vehicle; where said plurality of mounting brackets have a resilient coating adapted to substantially absorb ultrasonic vibrations generated by said ultrasonic transceivers, and where said alarm means comprises a control means for processing said trigger signal from said threshold detector, to permit different types of alarm indications for different trigger signals, said control means comprising a microprocessor with associated circuits, said microprocessor running a predictive window filtering scheme program using two previous said echoes detected with said transceiver to verify that a latest received echo falls in a window of time that corresponds to a rate of change in said previous two echoes, and if said latest echo is valid, then said predictive window is shifted to reflect a new object position.

5. An obstacle proximity warning device according to claim 4, where one of said plurality of pre-amplifiers is mounted in each of said housings together with said ultrasonic transceiver.

6. An obstacle proximity warning device according to claim 4, where said alarm means comprises a control means for processing said trigger signal from said plurality of threshold detectors, to permit different types of alarm indications for different trigger signals.

7. An obstacle proximity warning device according to claim 4, where said device further comprises a multiplexing means connected to said alarm means and to which each one of the plurality of ultrasonic transceivers is connected, said multiplexing means being configured to cycle through the connections of the plurality of ultrasonic transceivers so that only one of said plurality of ultrasonic transceivers is connected to said alarm means at one time.

* * * * *